(12) United States Patent
Ogishima et al.

(10) Patent No.: US 8,995,750 B2
(45) Date of Patent: Mar. 31, 2015

(54) IMAGE COMPOSITION APPARATUS, IMAGE RETRIEVAL METHOD, AND STORAGE MEDIUM STORING PROGRAM

(75) Inventors: Kiyoshi Ogishima, Akiruno (JP); Yoshihisa Matsumoto, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 545 days.

(21) Appl. No.: 13/247,150

(22) Filed: Sep. 28, 2011

(65) Prior Publication Data

US 2012/0082369 A1   Apr. 5, 2012

(30) Foreign Application Priority Data

Sep. 30, 2010  (JP) .................................. 2010-220113
Aug. 29, 2011  (JP) .................................. 2011-185936

(51) Int. Cl.
*G06K 9/00* (2006.01)
*G06K 9/36* (2006.01)
*H04N 13/00* (2006.01)

(52) U.S. Cl.
CPC .... *H04N 13/0022* (2013.01); *H04N 2013/0081* (2013.01)
USPC .......................................... 382/154; 382/285

(58) Field of Classification Search
USPC .......................................................... 382/285
See application file for complete search history.

(56) References Cited

U.S. PATENT DOCUMENTS

| | | | |
|---|---|---|---|
| 6,037,933 A * | 3/2000 | Blonstein et al. | 715/721 |
| 6,313,866 B1 | 11/2001 | Akamatsu et al. | |
| 6,891,533 B1 * | 5/2005 | Alcorn et al. | 345/419 |
| 7,511,730 B2 | 3/2009 | Kondo et al. | |
| 8,310,538 B2 * | 11/2012 | Yanagita | 348/135 |
| 8,384,769 B1 * | 2/2013 | Hong et al. | 348/51 |
| 8,605,136 B2 * | 12/2013 | Yu et al. | 348/51 |
| 2001/0045979 A1 * | 11/2001 | Matsumoto et al. | 348/43 |
| 2002/0028014 A1 * | 3/2002 | Ono | 382/154 |
| 2002/0113791 A1 * | 8/2002 | Li et al. | 345/427 |
| 2002/0191841 A1 * | 12/2002 | Harman | 382/154 |
| 2005/0089212 A1 * | 4/2005 | Mashitani et al. | 382/154 |
| 2009/0142041 A1 * | 6/2009 | Nagasawa et al. | 386/124 |
| 2009/0195643 A1 * | 8/2009 | Neuman | 348/51 |
| 2010/0074594 A1 * | 3/2010 | Nakamura et al. | 386/92 |
| 2010/0162098 A1 * | 6/2010 | Tirrella | 715/234 |

(Continued)

FOREIGN PATENT DOCUMENTS

| | | |
|---|---|---|
| CN | 1465196 A | 12/2003 |
| JP | 11-113028 A | 4/1999 |

(Continued)

OTHER PUBLICATIONS

Search notes from google scholar, microsoft academic, ip.com attached.*

(Continued)

*Primary Examiner* — Michelle Entezari
(74) *Attorney, Agent, or Firm* — Holtz, Holtz, Goodman & Chick PC

(57) ABSTRACT

There is provided an image composition apparatus including a parallax deriving unit configured to derive a parallax of one area in a background image, the one area corresponding to one object in the background image, an image selection unit configured to select an image which has a parallax different from the parallax of the one area in the background image, as a material image, from a plurality of three-dimensional images, each of which is viewed as a specific object in a three-dimensional manner, and an image composition unit configured to superpose the material image selected by the image selection unit on the background image.

5 Claims, 10 Drawing Sheets

(56) References Cited

U.S. PATENT DOCUMENTS

| | | | |
|---|---|---|---|
| 2010/0177403 A1* | 7/2010 | Dolgoff | 359/629 |
| 2010/0188572 A1* | 7/2010 | Card, II | 348/468 |
| 2010/0309287 A1* | 12/2010 | Rodriguez | 348/43 |
| 2011/0025830 A1* | 2/2011 | McNamer et al. | 348/50 |

FOREIGN PATENT DOCUMENTS

| | | |
|---|---|---|
| JP | 11-341522 A | 12/1999 |
| JP | 2004-134950 A | 4/2004 |
| JP | 2004-289527 A | 10/2004 |
| JP | 2009-077276 A | 4/2009 |

OTHER PUBLICATIONS

Chinese Office Action dated Jan. 6, 2014 (and English translation thereof) in counterpart Chinese Application No. 201110295691.9.

Japanese Office Action dated Nov. 12, 2013 (and English translation thereof) in counterpart Japanese Application No. 2011-185936.

* cited by examiner

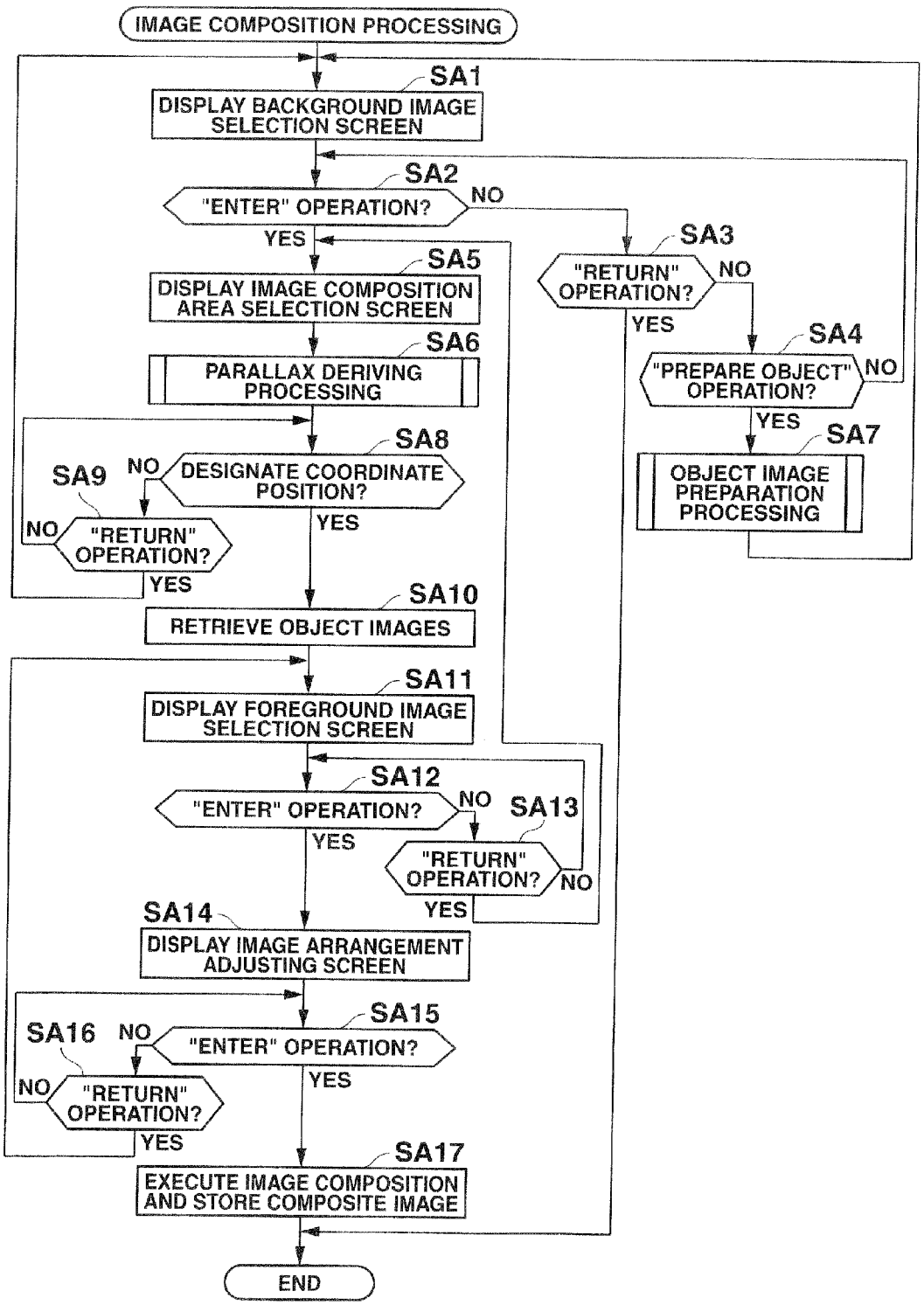

FIG.7A

$$\begin{pmatrix} -1 & -1 & -1 \\ -1 & -8 & -1 \\ -1 & -1 & -1 \end{pmatrix}$$

FIG.7B

$$\begin{pmatrix} -1 & -3 & -4 & -3 & -1 \\ -3 & 0 & 6 & 0 & -3 \\ -4 & 6 & 20 & 6 & -4 \\ -3 & 0 & 6 & 0 & -3 \\ -1 & -3 & -4 & -3 & -1 \end{pmatrix}$$

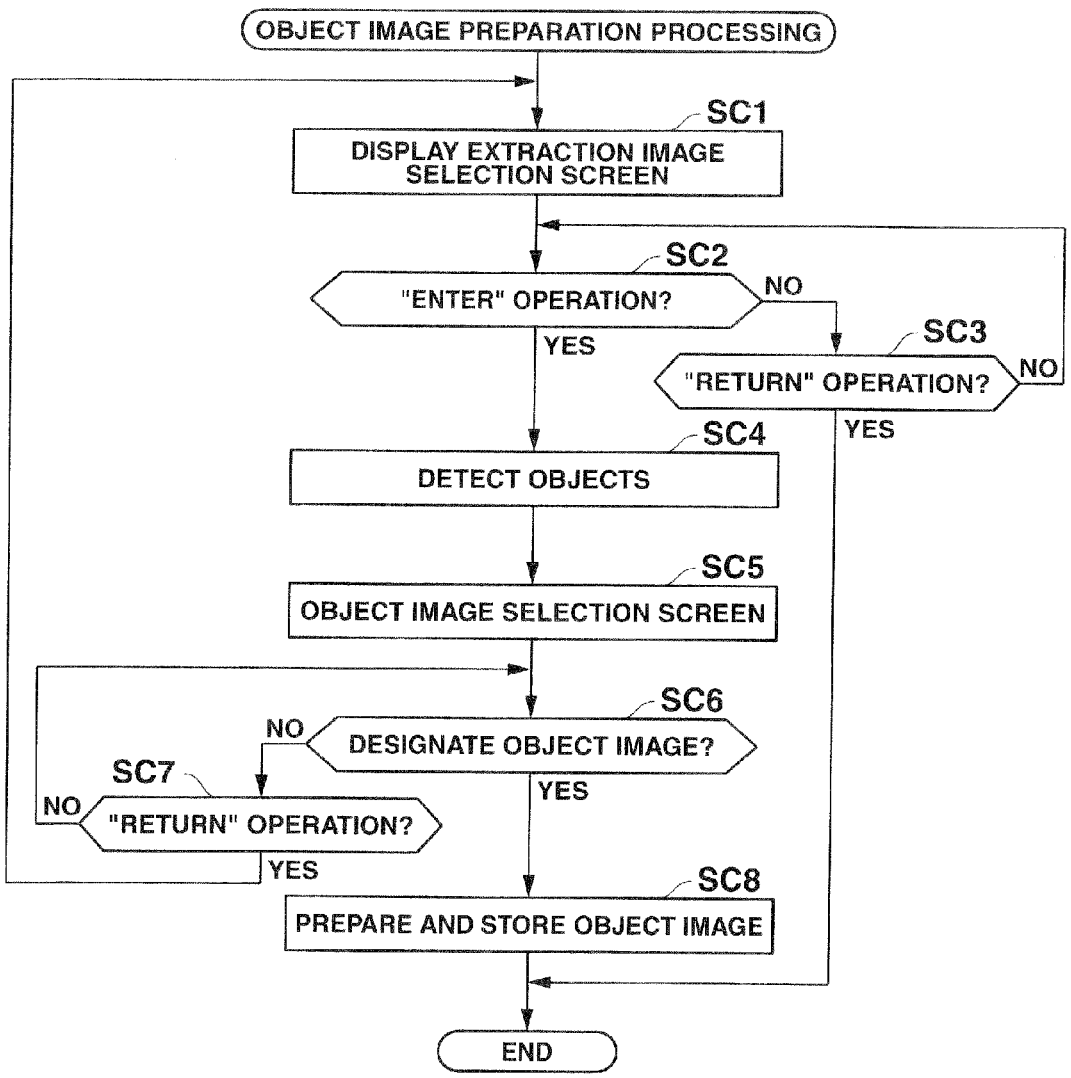

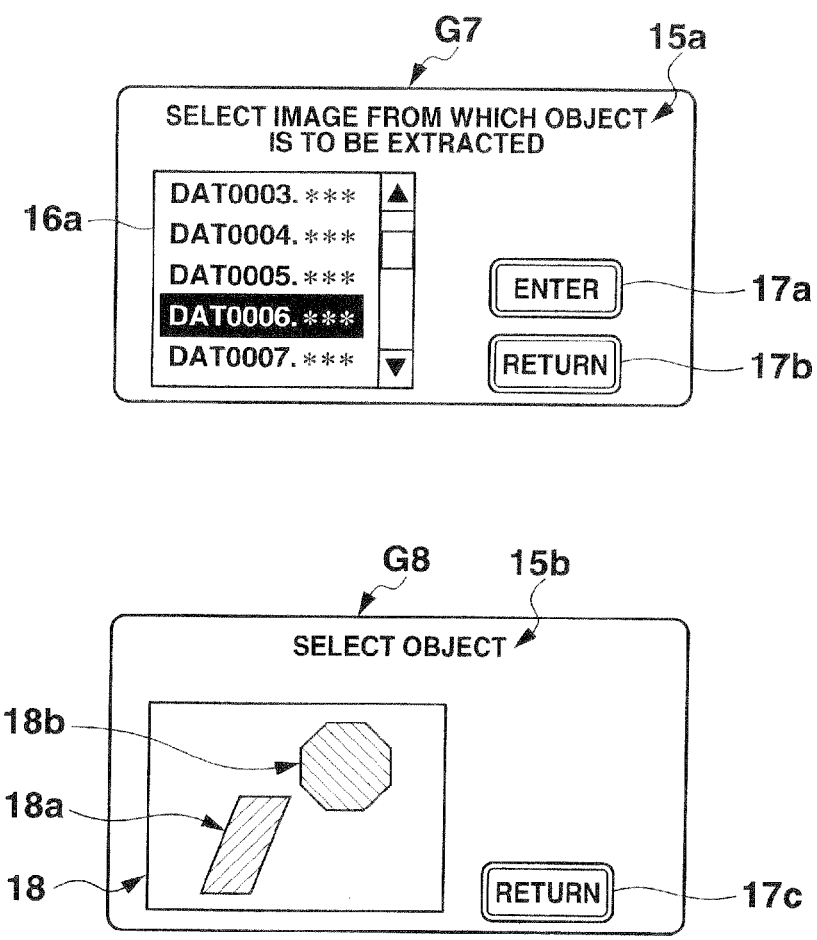

IMAGE COMPOSITION APPARATUS, IMAGE RETRIEVAL METHOD, AND STORAGE MEDIUM STORING PROGRAM

CROSS-REFERENCE TO RELATED APPLICATIONS

This application is based upon and claims the benefit of priority from prior Japanese Patent Applications No. 2010-220113, filed Sep. 30, 2010; and No. 2011-185936, filed Aug. 29, 2011, the entire contents of all of which are incorporated herein by reference.

BACKGROUND OF THE INVENTION

1. Field of the Invention

The present invention relates to an image composition apparatus, image retrieval method, and a storage medium storing program.

2. Description of the Related Art

For example, as disclosed in Jpn. Pat. Appln. KOKAI Pub. No. 2004-134950 (hereinafter referred to as Patent Document 1), a technique of executing image composition by superposing a material image on an image taken by a digital camera or the like is well known in the prior art.

In addition, as disclosed in Jpn. Pat. Appln. KOKAI Pub. No. 11-341522 (hereinafter referred to as Patent Document 2), known is a technique of causing the user to view an image in a three-dimensional manner (as a three-dimensional image), by preparing a pair of left and right images, between which parallax exists, that is, a left-eye image and a right-eye image between which the position of the same object in the image is shifted to left and right, and causing the viewer to view the left-eye image by the left eye and view the right-eye image by the right eye.

In the meantime, even in an image (hereinafter referred to as "three-dimensional image") which is viewed in a three-dimensional manner by the technique disclosed in Patent Document 2, a left-eye image and a right-eye image which form the three-dimensional image are still images which are the same as an image taken by a digital camera or the like. Therefore, it is possible to extract a partial image (hereinafter referred to as "object image") which corresponds to a part (hereinafter referred to as "object") recognized as an independent object such as a person from another three-dimensional image, and superpose the extracted partial image on a three-dimensional image. Specifically, a left-eye image of the object image is superposed on a left-eye image which forms a three-dimensional image serving as a background, a right-eye image of the object image is superposed on right-eye image which forms the three-dimensional image serving as a background, and thereby a new three-dimensional image can be obtained.

However, in the case where a three-dimensional image includes a plurality of objects which have different impressions of distance when the three-dimensional image is viewed, when part of the object which is perceived as relatively existing in the front is concealed by another object which is perceived as relatively existing in the rear, the three-dimensional image causes the user to feel something is wrong. Therefore, when any of object images prepared in advance is superposed on a desired position of the three-dimensional image serving as a background, it is necessary to select an object image which is suitable for superposing, in consideration of difference in impression of distance from other objects in the three-dimensional image after image composition.

Therefore, when an object image is selected, for example, it is necessary for the worker to check for each object image whether the object image in the three-dimensional image after image composition causes a feeling that something is wrong or not, by viewing the individual object images and the three-dimensional image serving as a background in a three-dimensional manner. As much time is required for the worker to select an object image this causes the problem of increased worker's labor.

BRIEF SUMMARY OF THE INVENTION

According to one aspect of the present invention, there is provided an image composition apparatus comprising: a parallax deriving unit configured to derive a parallax of one area in a background image, the one area corresponding to one object in the background image; an image selection unit configured to select an image which has a parallax different from the parallax of the one area in the background image, as a material image, from a plurality of three-dimensional images, each of which is viewed as a specific object in a three-dimensional manner; and an image composition unit configured to superpose the material image selected by the image selection unit on the background image.

According to another aspect of the present invention, there is provided an image retrieval method comprising: deriving a parallax of one area in a background image, the one area corresponding to one object in the background image; and selecting an image which has a parallax different from the parallax of the one area in the background image, as a material image, from a plurality of three-dimensional images, each of which is viewed as a specific object in a three-dimensional manner.

According to still another aspect of the present invention, there is provided a non-transitory computer-readable storage medium having program code stored thereon for causing a computer to perform image retrieval, the program code comprising: deriving a parallax of one area in a background image, the one area corresponding to one object in the background image; and selecting an image which has a parallax different from the parallax of the one area in the background image, as a material image, from a plurality three-dimensional images, each of which is viewed as a specific object in a three-dimensional manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 1A and 1B are external appearance diagrams of a digital photo frame, in which FIG. 1A illustrates a front of the digital photo frame and FIG. 1B illustrates a side of the digital photo frame.

FIGS. 3A and 3B are explanatory diagrams of screens which are displayed on a display unit, in which FIG. 3A illustrates a screen when the power is turned on and FIG. 3B illustrates a screen when image editing is selected.

FIG. 4 is a flowchart for explaining image composition processing.

FIGS. 5A to 5D are explanatory diagrams of screens which are displayed on the display unit, in which FIG. 5A illustrates a background image selection screen, FIG. 5B illustrates an image composition area selection screen, FIG. 5C illustrates a foreground image selection screen, and FIG. 5D illustrates an image arrangement adjusting screen.

FIGS. 7A and 7B are explanatory diagrams of a Laplacian filter, in which FIG. 7A illustrates a filter structure of 3×3 matrix, and FIG. 7B illustrates a filter structure of 5×5 matrix.

FIG. 9 is a flowchart for explaining object image preparation processing.

FIGS. 10A and 10B are explanatory diagrams for screens displayed on the display unit, in which FIG. 10A illustrates an extraction image selection screen, and FIG. 10B illustrates an object image selection screen.

DETAILED DESCRIPTION OF THE INVENTION

Embodiments the present invention will be explained with reference to the drawings.

First Embodiment

An embodiment for carrying out the present invention will be explained hereinafter.

The present embodiment relates to a digital photo frame which has a function as an image composition apparatus of the present invention. The digital photo frame is an apparatus, a main purpose of which is to display images that are taken by a digital camera or the like and recorded as image data for viewing. The digital photo frame of the present embodiment also has a function of displaying three-dimensional images and a function of execute image composition using three-dimensional images. A digital photo frame 1 of the present embodiment will be explained hereinafter with reference to drawings.

Figure 1A:
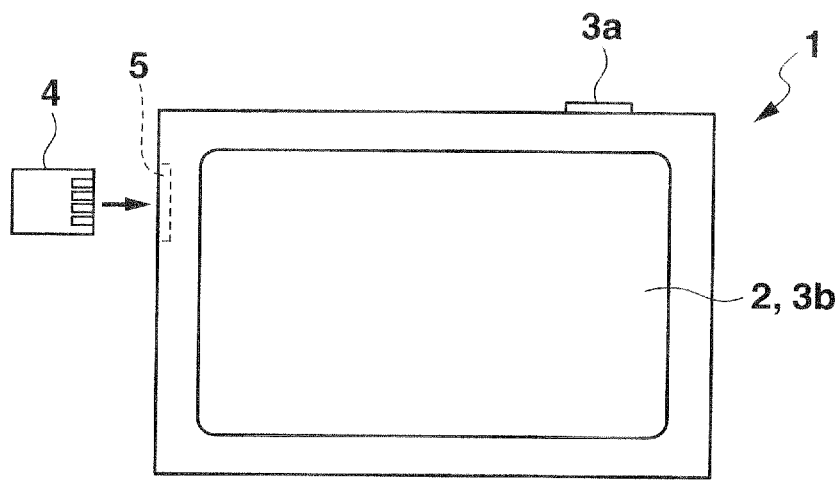
Figure 1B:
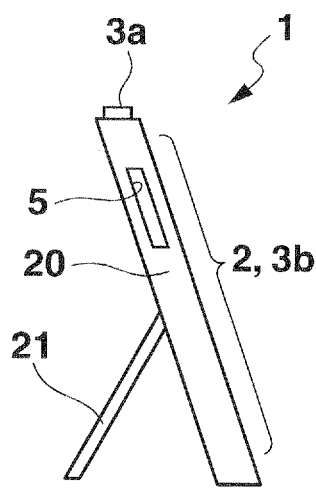

As illustrated in FIGS. 1A and 1B, the digital photo frame 1 of the present embodiment includes a display unit 2 which is provided on a front surface of a main body unit 20, a power switch 3a, a touch panel 3b which is disposed to be superposed on the display unit 2, and a medium attachment unit 5 to which a card-type storage medium 4 storing various image data is attached. A back surface of the main body unit 20 of the digital photo frame 1 is provided with a stand 21 which can be opened and closed with respect to the main body unit 20, such that digital photo frame 1 can be placed with the main body unit 20 slightly inclined backward.

Figure 2:
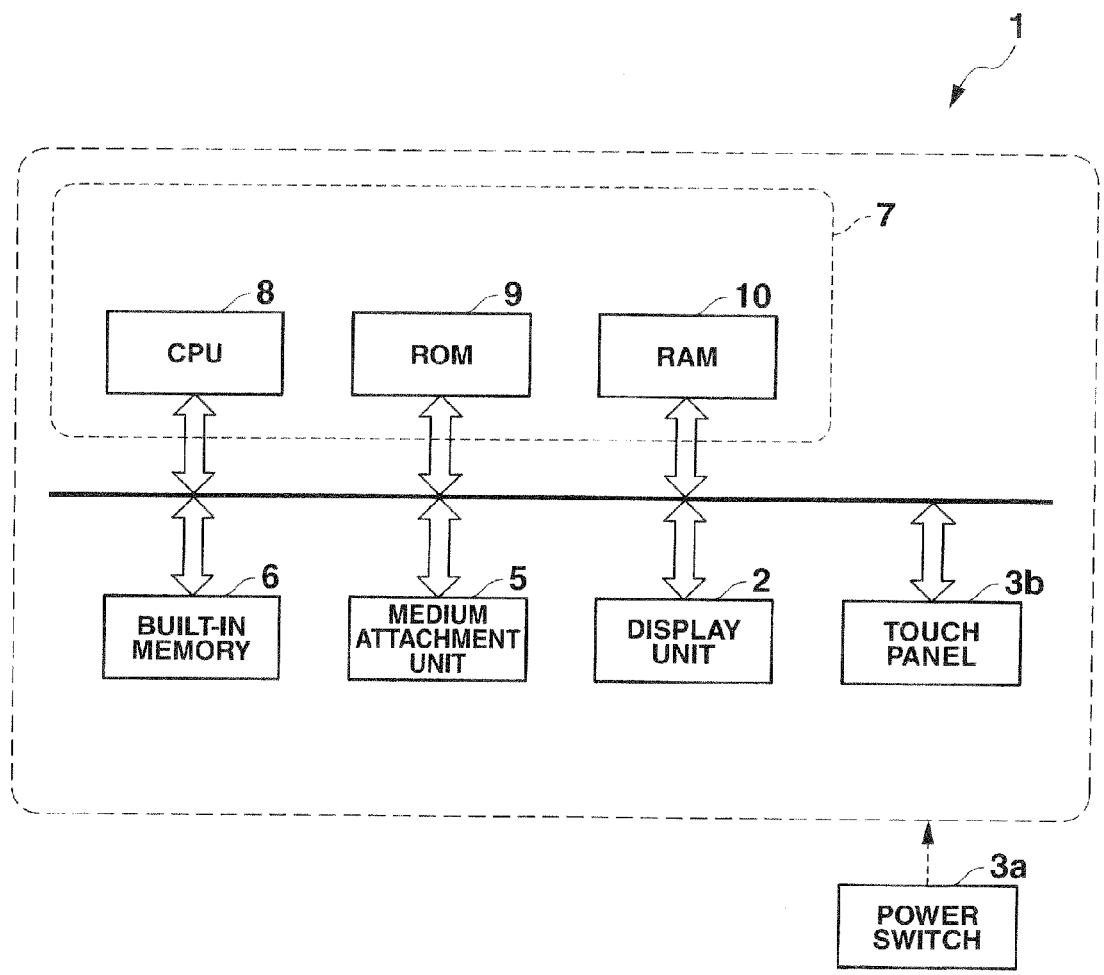
FIG. 2 is a diagram illustrating a system configuration of the digital photo frame.

FIG. 2 is a system configuration diagram illustrating an electric structure of the digital photo frame 1. As illustrated in FIG. 2, the digital photo frame 1 includes a built-in memory 6, and a controller 7, in addition to the display unit 2, the power switch 3a, the touch panel 3b, and the medium attachment unit 5 described above.

The medium attachment unit 5 is specifically an input/output interface which controls input and output of data between the storage medium 4 and the controller 7, and is formed of circuits for control. The storage medium 4 stores a plurality of image data items.

The image data items stored in the storage medium 4 include image data which is obtained by a digital camera or the like by shooting, and three-dimensional image data.

The image data obtained by a digital camera is data stored as an image file, in which additional information such as the shooting date and thumbnail image (reduced image) data is added to the image data main body compressed by JPEG (Joint Photographic Expert Group) or the like, together with basic information such as the size (the number of pixels in the vertical direction and the horizontal direction) of the image data main body.

The three-dimensional data is image data which indicates a three-dimensional image, such as a pair of left-eye image data and right-eye image data which are obtained by converting a pair of left and right photographs (left-eye image and right-eye image) taken by a stereo camera into digital data items, and a pair of left-eye image data and right-eye image data which are generated from a single image data by using an image processing technique.

The left-eye image data and the right-eye image data are also data items stored as image files, in each of which additional information is added to an image data main body compressed by JPEG or the like. However, each of the left-eye image data and the right-eye image data includes, as additional information, identification information which indicates that the image data is three-dimensional image data, and identification information which indicates that the image data is left-eye image data or right-eye image data, as well as basic information such as the size of the image data main body.

The display unit 2 is, for example, a liquid crystal display unit or an organic EL display unit. The display unit 2 displays ordinary two-dimensional images and three-dimensional images based on image data which is read from the storage medium 4 through the medium attachment unit 5, and various display menus including one or a plurality of operation images (hereinafter referred to as "soft keys"). The display unit 2 also displays three-dimensional images based on three-dimensional image data generated by the controller 7.

The three-dimensional image display method used in the digital photo frame 1 is, for example, a parallax barrier method and a time-division display method.

The parallax barrier method is a method of displaying first pixels which are gradation-controlled based on left-eye image data and second pixels which are gradation-controlled based on right-eye image data, such that the first pixels and the second pixels are alternately arranged in the horizontal direction, causing the user in a predetermined viewing position to view the first pixels only by the left through a parallax barrier, and causing the user to view the second pixels only by the right eye through the parallax barrier. Therefore, the digital photo frame adopting the parallax barrier method has a structure in which the display unit 2 includes a barrier display device such as a liquid crystal panel, which displays (forms) a parallax barrier in front of the display screen.

The time-division display method is a method of alternately displaying a left-eye image based on left-eye image data and a right-eye image based on right-eye image data in a time-division manner, and alternately shutting off the field of vision of the user's left eye and the field of vision of the user's right eye. Therefore, in the digital photo frame adopting the time-division display method, it is necessary to cause the user to wear a view field controller such as glasses, which alternately shuts off the field of vision of the left eye and the right eye in synchronization with the display timing of the left-eye image and the right-eye image, when a three-dimensional image is viewed.

The touch panel 3b is an input device which detects, as input information, a user's touching position in the display screen of the display unit 2, in a state where one or a plurality of soft keys are displayed on the display unit 2. As the touch panel 3b, it is possible to adopt a publicly-known resistive touch panel or a capacitive touch panel.

The resistive touch panel detects a touching position by measuring a partial pressure ratio obtained by a resistor of a transparent electrode which is formed of ITO (Indium Tin Oxide) that has relatively high transparency. The capacitive touch panel detects a touching position by using a plurality of transparent electrode patterns formed of ITO films as sensors which extend and cross each other and detecting a change in surface charge.

The built-in memory 6 is a flash memory, storage content of which is maintained even when the power is turned off, and storage data of which is rewritable. More specifically, the built-in memory is an EEPROM (Electric Erasable Programmable Read Only Memory). The built-in memory 6 stores three-dimensional image data and object image data which are generated in the digital photo frame 1 as described below.

Although details thereof will be described below, the object image data is three-dimensional image data which indicates a three-dimensional image (material image) which is viewed in a three-dimensional manner as a specific object such as a person. The object image data is formed of a pair of left-eye image data and right-eye image data. Each of the left-eye image data and the right-eye image data is color image data which has gradation values of a red component, a green component, and a blue component as color components for each display coordinates.

The controller 7 includes a CPU (Central Processing Unit) 8, a ROM 9 (Read Only Memory) which stores a control program executed by the CPU 8, and a RAM (Random Access Memory) 10 which serves as a work area.

The ROM 9 is a memory which stores a plurality of programs and data items for causing the CPU 8 to control the whole system. The programs stored in the ROM 9 include a three-dimensional image composition program which causes the CPU 8 to function as parallax deriving means, retrieval means, and image composition means, in the present embodiment.

The RAM 10 is a work memory which temporarily stores various data items when the CPU 8 controls the digital photo frame 1. Specifically, the RAM 10 is an SDRAM (Synchronous dynamic random-access memory) or the like.

Next, an operation carried out in the digital photo frame 1 having the above structure will be explained hereinafter. In the digital photo frame 1, when the power is turned on by user's operation of the power switch 3a, the CPU 8 starts control based on the program stored in the ROM 9, and directly displays a function selection menu on the display unit 2.

Figure 3A:
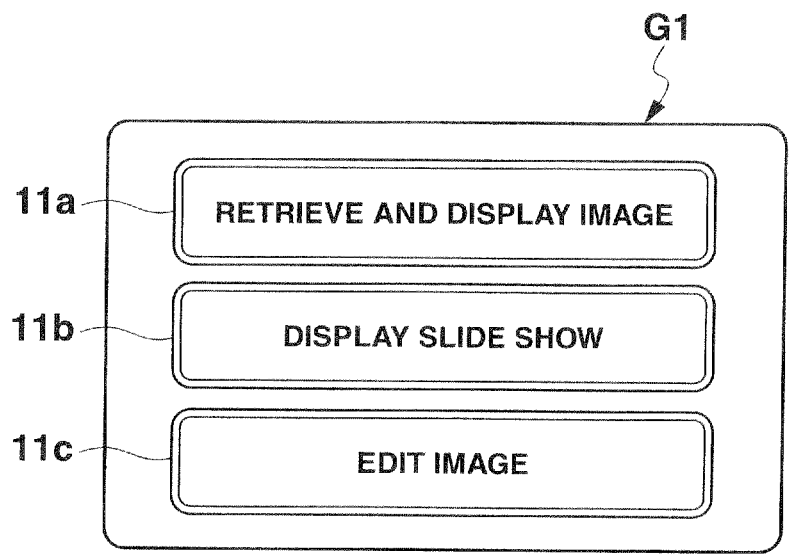

FIG. 3A is a diagram illustrating an example of a function selection menu G1 displayed on the display unit 2. The function selection menu C1 is formed of a soft key 11a to which an image retrieval function is assigned, a soft key 11b to which a slide show function is assigned, and a soft key 11c to which an image editing function is assigned.

The image retrieval function is a function for causing the user to select a desired image from images stored as image data in the storage medium 4, and causing the display unit 2 to display the selected image, and the slide show function is a function for displaying a plurality of images stored as image data in the storage medium 4 as a slide show in a predetermined order. The image editing function is a function for editing an image which is stored as image data.

While the function selection menu C1 is displayed, when one of the soft keys 11a, 11b, and 11c is touched by the user, that is, when any position in the area corresponding to one of the soft keys 11a, 11b, and 11c in the touch panel 3b is detected as a touching position, the CPU 8 goes to processing which corresponds to the function of the touched soft key.

Figure 3B:
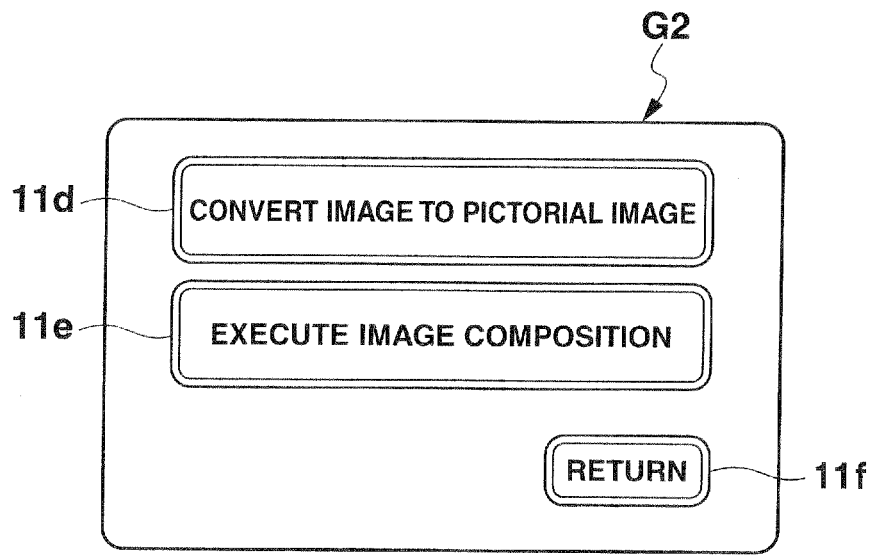

When the user touches the soft key 11c which has the image editing function, the CPU 8 displays an editing selection menu G2 as illustrated in FIG. 3B on the display unit 2. The editing selection menu G2 is formed of a soft key 11d to which a pictorial converting function is assigned, a soft key 11c to which an image composition function is assigned, and a soft key 11f which shows the expression "Return".

The pictorial converting function is a function for causing the user a desired image from images stored as image data in the storage medium 4, subjecting the selected image (image data) to image processing, and thereby converting the original image to a pictorial image. The pictorial image is an image which has a specific touch (pictorial characteristic) such as Japanese-style painting, Western painting, watercolor painting, India-ink painting, and ink drawing. The image composition function is a function for executing image composition using two different three-dimensional images which are stored as three-dimensional image data in the storage medium 4. The details of the image composition function will be described later.

Then, in the digital photo frame 1, when the soft key 11d to which the pictorial converting function is assigned is touched by the user in the editing selection menu G2, the CPU 8 goes to processing which corresponds to the pictorial converting function. When the soft key 11f which shows "Return" is touched, the CPU 8 displays the function selection menu G1 again on the display unit 2. In the editing selection menu G2, when the user touches the soft key 11e to which the image composition function is assigned, the CPU 8 performs the image composition processing explained below, which corresponds to the image composition function.

The image composition function in the present embodiment is processing for executing image composition by superposing an object image which is extracted from another three-dimensional image as a foreground image on a three-dimensional image which is selected by the user as a background. The specific processing order of the image composition processing executed by the CPU 8 will be explained hereinafter with reference to a flowchart illustrated in FIG. 4.

Figure 5A:
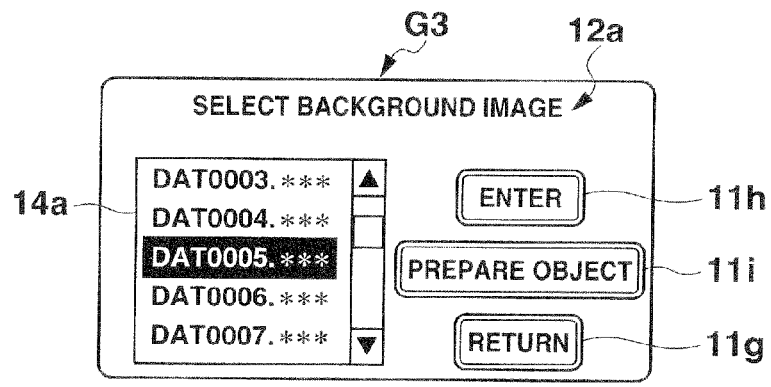

In the image composition processing, first, the CPU 8 displays a background image selection screen G3 illustrated in FIG. 5A on the display unit 2 (Step SA1). The background image selection screen G3 includes a message 12a such as "Select background image", an image list 14a which shows images which can be selected as a background image, a soft key 11g which shows the expression "Return", a soft key 11h which shows "Enter", and a soft key 11i which shows "Prepare object".

When the background image selection menu G3 is displayed, the CPU 8 displays only three-dimensional image data items stored in the storage medium 4 as selectable images in the image list 14a. FIG. 5A shows an example in which image file names of a predetermined one of left-eye image data and right-eye image data of the three-dimensional image data items are listed as the image list 14a. However, actually, it is desirable to list thumbnail images which are reduced images of images indicated by a predetermined one of left-eye image data and right-eye image data of the three-dimensional image data items.

While the background image selection screen G3 is displayed, when any of image file names displayed in the image list 14a is selected by the user by touch operation of the touch panel 3b, the CPU 8 displays the selected image file name by outline characters.

Then, when the user touches (operates) the soft key 11g which shows "Return" (Step SA3: YES), the CPU 8 immediately ends the image composition processing, and displays the editing selection menu G2 again on the display unit 2.

When the user touches the soft key 11i which shows "Prepare object" (Step SA4: YES), the CPU 8 executes object image preparation processing (Step SA7).

Although details thereof will be described later, the object image preparation processing is processing to extract object image data from three-dimensional image data stored in the storage medium 4, and store the extracted object image data in the built-in memory 6 in advance.

Then, when the soft key 11h which shows "Enter" is touched in a state where any of the image file names (three-dimensional image data) displayed in the image list 14a is selected (Step SA2: YES), the CPU 8 displays an image composition area selection screen G4 illustrated in FIG. 5B on the display unit 2 (Step SA5). The image composition area selection screen G4 includes a message 12b such as "Select image composition area", a three-dimensional image 13a based on the selected three-dimensional image data, and a soft key 11j which shows "Return".

Then, the CPU 8 executes parallax deriving processing to obtain a parallax which exists between the left-eye image data and the right-eye image data that form the three-dimensional image data, from the three-dimensional image data selected by the user, for each object which exists in a three-dimensional image indicated by the three-dimensional image data (Step SA6). The parallax which the CPU 8 obtains for each object is information which is obtained by quantifying a distance impression which is perceived for each object in the three-dimensional image when the three-dimensional image is viewed.

Figure 6:
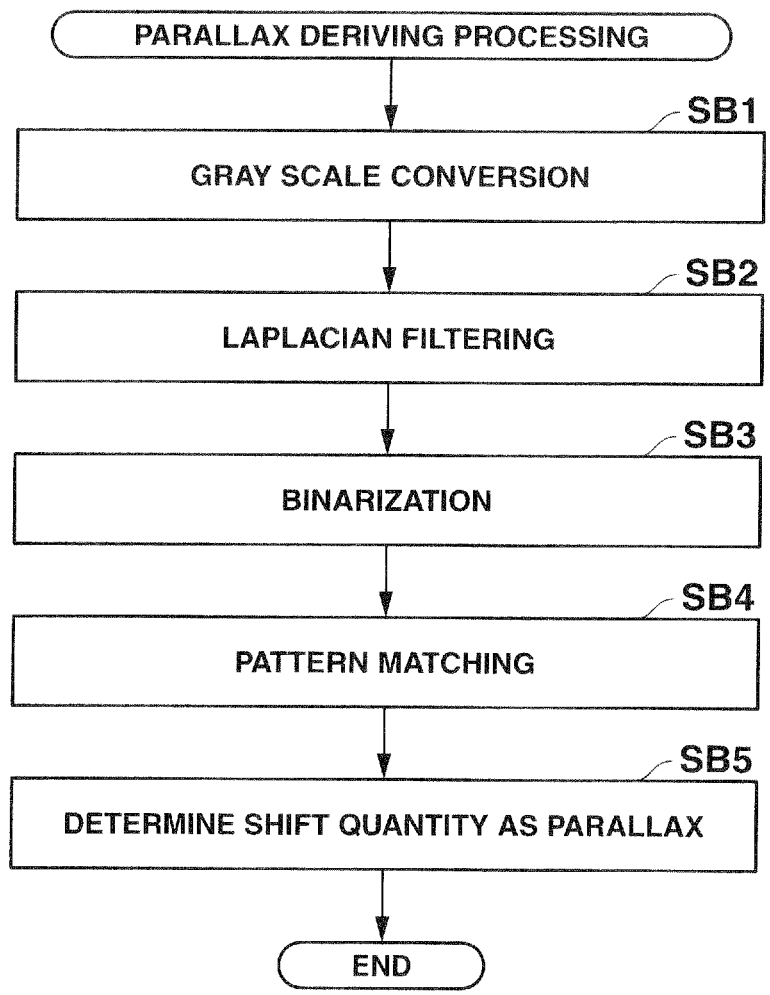
FIG. 6 is a flowchart for explaining parallax deriving processing.

The specific processing order of the parallax deriving processing executed by the CPU 8 will be detailed based on the flowchart illustrated in FIG. 6. The following explanation mainly shows the case where the three-dimensional image data is color image data.

In the parallax deriving processing, the CPU 8 individually performs gray scale conversion for the left-eye image data and the right-eye image data, by using the following expression (Step SB1).

$$Y(i)=0.298912 \times R(i)+0.586611 \times G(i)+0.114478 \times B(i)$$

In the above expression, Y (i) is rounded to an integer, and i indicates the coordinate position of the pixel which is gradation-controlled.

Next, the CPU 8 performs Laplacian filtering for each of the left-eye image data and the right-eye image data subjected to grey scale conversion, and generates left-eye image data and right-eye image data in which the edge of the image is emphasized (Step SB2). As the Laplacian filter, for example, it is possible to use a digital filter of 3×3 matrix as illustrated in FIG. 7A, and a digital filter of 5×5 matrix as illustrated in FIG. 7B.

Next, the CPU 8 performs binarization for each of the edge-emphasized left-eye image data and right-eye image data, with a border of a predetermined gradation threshold, and generates left-eye image data and right-eye image data as edge image data with image edge extracted (Step SB3). In the following explanation, edge image data which is generated based on the left-eye image data is called left-eye edge image data, and edge image data which is generated based on the right-eye image data is called right-eye edge image data to distinguish them.

Figure 8:
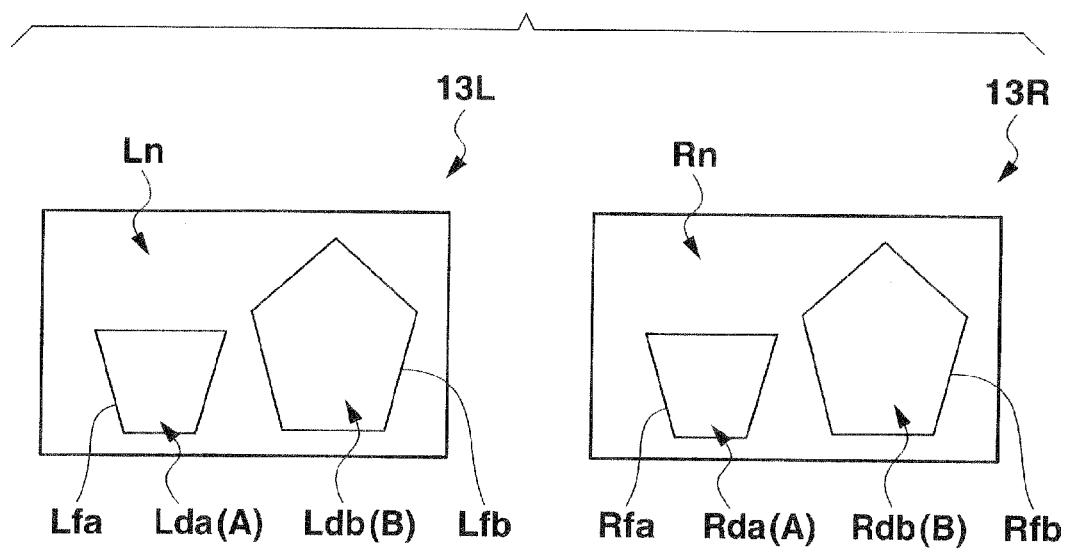
FIG. 8 is an explanatory diagram of edge image data obtained by binarization.

FIG. 8 is a diagram illustrating an example of left-eye edge image data 13L and right-eye edge image data 13R, which are obtained by binarization. In the left-eye edge image data 13L and the right-eye edge image data 13R, frame-shaped edges can be obtained as outlines which indicate an object (partial area which is recognized as an independent object such as a person) which is common to them. Specifically, as illustrated in FIG. 8, when two objects exist in the three-dimensional image, two frame-shaped edges Lfa and Lfb are obtained in the left-eye edge image data 13L, and two frame-shaped edges Rfa and Rfb are obtained in the right-eye edge image data 13R.

Between the left-eye edge image data 13L and the right-eye edge image data 13R, an area Lda indicated by the edge Lfa and an area Rda indicated by the edge Rfa correspond to the same object A existing in the three-dimensional image, and an area Ldb indicated by the edge Lfb and an area Rdb indicated by the edge Rfb correspond to the same object B existing in the three-dimensional image.

A position shift quantity in a horizontal direction in the image between the edge Lfa and the edge Rfa which correspond to each other is the parallax of one object A, and a position shift quantity in a horizontal direction in the image between the edge Lfb and the edge Rfb which correspond to each other is the parallax of the other object, B.

Therefore, after binarization, the CPU 8 individually obtains the coordinate position of each of the edge Lfa and the edge Lfb which exist in the left-eye edge image data 13L, and individually obtains the coordinate position of each of the edge Rfa and the edge Rfb which correspond to the edges Lfa and Lfb, respectively, and existing in the right-eye edge image data 13R, by pattern matching using block matching or the like (Step SB4).

Thereafter, the CPU 8 calculates the horizontal position shift quantity between the edge Lfa and the edge Rfa from the coordinate positions of the edge Lfa and the edge Rfa, determines a calculation result as the parallax of one object A, calculates the horizontal position shift quantity between the edge Lfb and the edge Rfb from the coordinate positions of the edge Lfb and the edge Rfb, and determines a calculation result as the parallax of the other object, B (Step SB5).

When the edge image data items obtained by binarization are the left-eye edge image data 13L and the right-eye edge image data 13R as illustrated in FIG. 8, areas Ln and Rn which are not enclosed by frame-shaped edges are regarded as image areas having no parallax, and shift quantities of the areas Ln and Rn are determined as 0.

Figure 5B:
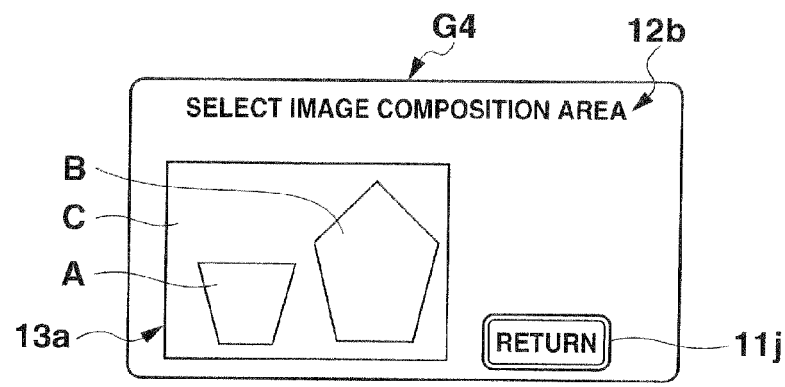

With reference to FIG. 4 again, when the parallax deriving processing is finished, the CPU 8 determines whether a desired coordinate position of the three-dimensional image 13a is touched (designated) by the user in the image composition area selection screen GA illustrated in FIG. 5B, and whether the soft key 11j which shows "Return" is touched or not (Steps SA8 and SA9).

Then, when a desired coordinate position of the three-dimensional image 13a is touched by the user (Step SA8: YES), the CPU 8 retrieves object image data which is suitable for superposing on the three-dimensional image 13a, from a plurality of object image data items stored in the built-in memory 6 in advance, based on the coordinate position touched by the user (Step SA10).

The object image data to be retrieved is prepared by the CPU 8 in object image preparation processing of Step SA7 described later and stored in the built-in memory 6. The object image data indicates a material image which is used as a foreground image to be superposed on the three-dimensional image selected by the user as a background. More specifically, the object image data is data which is extracted from three-dimensional image data (left-eye image data and right-eye image data) stored in the storage medium 4, and indicates an image of an area which corresponds to a desired object existing in the three-dimensional image indicated by the three-dimensional image data, that is, an object image.

In addition, data items which indicate the size, the shape, and the parallax of the object image data are added as additional information to the object image data. The data item which indicates the size indicates the number of pixels (area) of the object image data. The data which indicates the shape is coordinate position data for each pixel of pixels that express the edge of the object in the three-dimensional image data (one of the left-eye image data and the right-eye image data), from which the object image data is extracted. The data which indicates parallax indicates a horizontal position shift quantity of the object between the left-eye image indicated by the left-eye image data and the right-eye image indicated by the right-eye image data, from one of which the object image data is extracted.

Then, in the processing of Step SA10, the CPU 8 retrieves specific object image data which satisfies both the following first condition and the second condition, from the object image data items stored in the built-in memory 6, by checking the size, the shape, and the parallax indicated by the data items added as additional information to each of the object image data items.

The first condition is that the object image data item has a parallax which is larger than the parallax of the object that includes the coordinate position touched by the user at the above step SA8 in its area, and has a parallax which is larger than any parallax of each object which does not include the coordinate position touched by the user at the Step SA8 in its area. The second condition is that the object image data item indicates an object image which can be disposed without overlapping another object which exists in the three-dimensional image selected as a background and has a parallax larger than the parallax of the object image data.

The following is a detailed explanation of the specific object image data which is retrieved by the CPU 8 in the processing of Step SA10. In the three-dimensional image 13*a* of the image composition area selection screen G4 illustrated in FIG. 5B, supposing that the parallax of one object A is P (P>0), the parallax of the other object B is Q (Q>P), and the parallax of the background part C excluding the two objects A and B is 0, and the user designates a coordinate position on the object A, the specific object image data satisfies the following.

Specifically, the specific object image data has a size which falls within an area that is formed of the object A and the background part C, and has a parallax that is larger than the parallax P of the object A and smaller than the parallax Q of the other object B. In addition, the specific object image data has a size and a shape which fall within the area that is formed of the object A and the background part C, and has a parallax that is larger than the parallax P of the object A and smaller than the parallax Q of the other object B.

In addition, the specific object image data has a size which falls within an area that is formed of the two objects A and B and the background part C, and has a parallax which is larger than the parallax Q of the object B. Further, the specific object image data has a size and a shape which fall within the area that is formed of the two objects A and B and the background part C, and has a parallax which is larger than the parallax Q of the object B.

The specific object image data includes all the object image data items which have a size falling within the background part C, and all the object image data items which have a size and a shape that fall within the background part C.

Specifically, the specific object image data is object image data that is suitable for superposing and indicates an object image which gives the user (viewer) an impression of natural distance with respect to its relation with other objects A and B when the user views the three-dimensional image after image composition, when the object image is superposed on an area including the position designated by the user in the three-dimensional image 13*a*.

In other words, the specific object image data is obtained by excluding object image data which has a parallax of P or less, object image data which has a parallax from P to Q and has a size that does not fall within the area formed of the object A and the background part C, and object image data which has a parallax from P to Q and has a size and a shape that do not fall within the area formed of the object A and the background part C.

Specifically, the specific object image data is obtained by excluding object image data which indicate an object image which is perceived by the user (viewer) as having an unnatural distance relative to the other objects A and B in the three-dimensional image after image composition, when the object image is superposed on the area including the position designated by the user in the three-dimensional image 13*a*.

Figure 5C:
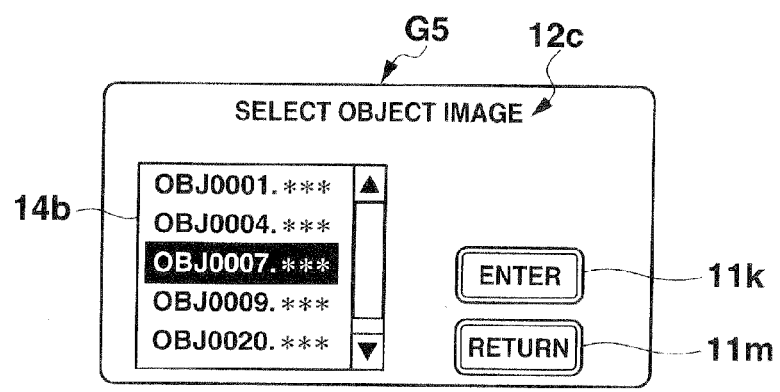

Thereafter, when retrieving in the processing of the step SA10 is finished, the CPU 8 displays a foreground image selection menu G5 illustrated in FIG. 5C on the display unit 2. The foreground image selection menu G5 includes a message 12*c* such as "Select object image", an image list 14*b* which shows specific object images retrieved in the processing of the step SA10 as selectable images, a soft key 11*k* which shows "Enter", and a soft key 11*m* which shows "Return".

FIG. 5C also shows the case where image file names of a predetermined one of the left-eye image data and the right-eye image data which form the object image data are displayed in the image list 14*h*, for the sake of convenience. However, actually, it is preferable to display thumbnail images which are reduced images of images indicated by image data of a predetermined one of the left-eye image data and the right-eye image data which form the object image data, as the list.

The object image data which are displayed with the image file names in the image list 14*b* are only specific object image data items which satisfy both the first condition and the second condition explained above. Specifically, they are the specific object image data items which are suitable for superposing on the position designated by the user in the three-dimensional image selected as the background.

Therefore, it is unnecessary for the user to perform the troublesome work of checking, for each object image, whether the three-dimensional image after image composition causes a feeling that something is wrong, by viewing each object image stored in the built-in memory 6 together with the background three-dimensional image in a three-dimensional manner. Therefore, it is possible to greatly reduce the time and labor necessary for the image composition processing.

When any of the image file names displayed in the image list 14*b* is selected by the user by touch operation of the touch panel 3b while the foreground image selection screen G5 is displayed, the CPU 8 displays the selected image file name with outline characters.

Figure 5D:
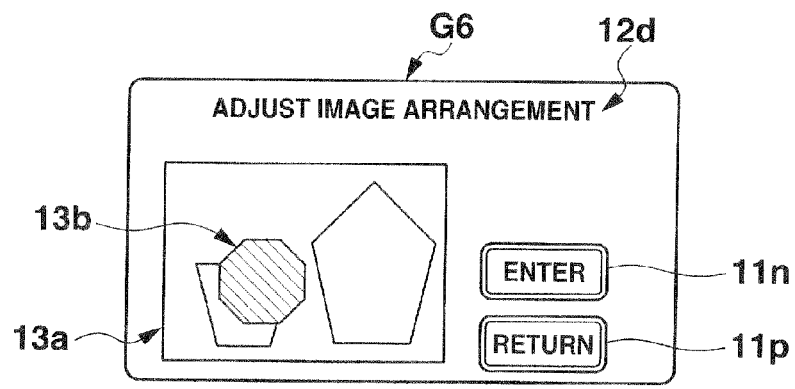

Then, when the soft key 11k which shows "Enter" is touched by the user through the touch panel 3b in a state where any three-dimensional image data item is selected (Step SA12: YES), the CPU 8 displays an image arrangement adjusting screen G6 illustrated in FIG. 5D on the display unit 2 (Step SA14).

The image arrangement adjusting screen G6 includes a message 12d such as "Adjust image arrangement", and an image in which an object image 13b based on the object image data item selected by the user in the foreground image selection screen G5 is superposed on the three-dimensional image 13a which serves as a background and is based on the three-dimensional image data selected by the user in the background image selection screen G3. The image arrangement adjusting screen G6 also includes a soft key 11n which shows "Enter", and a soft key 11p which shows "Return".

When the soft key 11m which shows "Return" is operated in the foreground image selection screen G5 (Step SA13: YES), the image composition area selection screen G4 is displayed on the display unit 2.

While the image arrangement adjusting screen G6 is displayed, the CPU 8 adjusts an arrangement position of the object image 13b with respect to the three-dimensional image 13a, in response to user's operation of putting the user's finger on a position at which the object image 13b is displayed and sliding the finger over the touch panel 3. Specifically, a drawing position of the object image 13b is successively changed in response to movement of the finger.

When the soft key 11n which shows "Enter" is touched (Step SA15: YES), the CPU 8 replaces an original gradation value of each pixel in the area where the object image 13b has superposed lastly on the three-dimensional image 13a, by a gradation value of each pixel of the object image. Thereby, the CPU 8 generates three-dimensional data which indicates a new three-dimensional image obtained by superposing the object image 13b on the three-dimensional image 13a, provides the generated three-dimensional image data with a predetermined file name, and stores the image data in the built-in memory 6 (Step SA17).

Thereby, the CPU 8 ends the image composition processing, and the digital photo frame 1 returns to a state of displaying the screen illustrated in FIG. 3A. When the soft key 11p which shows "Return" is operated in the image arrangement adjusting screen G6 (Step SA16: YES), the CPU 8 displays the foreground image selection screen G5 on the display unit 2.

Next, the following is a detailed explanation of processing order of the object image preparation processing which is executed by the CPU 8 when the soft key iii shows "Prepare object" in the background image selection screen G3, based on a flowchart illustrated in FIG. 9.

In the object image preparation processing, the CPU 8 immediately displays an extraction image selection screen G7 illustrated in FIG. 10A on the display unit 2 (Step SC1). The extraction image selection screen G1 includes a message 15a such as "Select image from which object is to be extracted.", an image list 16a which shows three-dimensional image data stored in the storage medium 4 as selectable images from which an object is to be extracted, a soft key 17a which shows "Enter", and a soft key 17b which shows "Return".

For the sake of convenience, FIG. 10A also shows the case where image file names of a predetermined one of the left-eye image data and the right-eye image data which form the three-dimensional image data are listed as the image list 16a. However, actually, it is preferable to list thumbnail images which are reduced images of images indicated by a predetermined one of left-eye image data and right-eye image data of the three-dimensional image data items.

In addition, the content of the image list 16a displayed in the extraction image selection screen G7 agree with the content of the image list 14a displayed in the background image selection screen G3 illustrated in FIG. 5A when there is no change in the three-dimensional image data items stored in the storage medium 4 from the above image composition processing.

When any of image file names displayed in the image list 16a is selected as an extraction image by the user by touch operation of the touch panel 3b while the extraction image selection image G7 is displayed, the CPU 8 displays the selected image file name with outline characters. When the soft key 17b which shows "Return" is touched in the extraction image selection screen G7 (Step SC3: YES), the CPU 8 immediately finishes the object image preparation processing, and displays the background image selection screen G3 on the display unit 2 (Step SA1).

Then, when the soft key 17a which shows "Enter" is touched in a state where any of the image file names (three-dimensional image data items) displayed in the image list 14a is selected as an extraction image (Step SC2: YES), the CPU 8 executes object detection processing (Step SC4). The object detection processing is processing of detecting objects which exist in the extraction image (three-dimensional image) indicated by the three-dimensional image data item and have parallax between the left-eye image data and the right-eye image data that form the three-dimensional image data item.

In the object detection processing, first, the CPU 8 temporarily detects one or a plurality of objects existing in the extraction image, by performing parallax deriving processing (see FIG. 6) which is the same as the processing of Step SA6 for the three-dimensional image data item selected as the extraction image, and determines a parallax for each of the detected objects. Thereafter, the CPU 8 lastly extracts only objects, the parallax of which is not 0, as objects.

Next, the CPU 8 displays an object image selection screen G8 illustrated in FIG. 10B on the display unit 2 (Step SC5). The object image selection screen G8 includes a message 15b such as "Select object", an extraction image 18 in a state where objects 18a and 18b which are extracted in the object detection processing are emphasized, and a soft key 17c which shows "Return".

For example, the CPU 8 performs emphasis of the objects in the extraction image 18, by maintaining color display only for the objects, and performing gray scale display for image areas other than the objects, to make the objects more distinguishable from the other image areas.

Then, when any of the objects is designated by the user through the touch panel 3b in the object image selection screen G8 (Step SC: YES), the CPU 8 generates an object image data item obtained by maintaining image data of an area which corresponds to the designated object and deleting image data of the other image areas, provides the object image data item with a predetermined file name, and stores the object image data item in the built-in memory 6 (Step SC8).

Thereby, the CPU 8 finishes the object image preparation processing, and displays the background image selection screen G3 on the display unit 2 (Step SA1).

When the object image data item is stored in the built-in memory 6 in the processing of Step SC8, the CPU 8 adds data items which indicate the size, the shape, and the parallax of the object image data item as additional information to the object image data item.

When the soft key 17c which shows "Return" is operated in the object image selection screen G8 (Step SC7: YES), the CPU 8 displays the extraction image selection screen G7 on the display unit 2.

In the first embodiment described above, object image data which satisfy both the above first condition and the second condition are retrieved when object image data which are suitable for superposing on a position designated by the user in the three-dimensional image selected as a background image are retrieved as selectable image data. However, object image data which satisfy only the first condition may be retrieved as selectable image data. Specifically, as selectable object image data, it is possible to retrieve object image data which have a parallax larger than the parallax of the position designated by the user in the three-dimensional image selected as a background image. In addition, the first condition may be changed to a condition in which the object image data have a parallax which is larger than the parallax of an object which includes a coordinate position touched by the user at the above Step SA8 in its area, among objects obtained by the CPU 8 in the parallax deriving processing of the Step SA6.

Even when object image data which satisfy only the first condition described above are retrieved as selectable image data, it is possible to greatly reduce the time and labor necessary for the image composition processing, in comparison with the case of checking for each object image regarding whether the three-dimensional image after image composition causes a feeling that something is wrong, by viewing a plurality of object images in a three-dimensional manner.

In addition, while the image arrangement adjusting screen G6 is displayed in the above first embodiment, the drawing position of the object image 13b may be adjusted such that a desired coordinate position of the object image 13b, which successively changed by the user's operation, does not overlap a desired coordinate position of the object. B. Specifically, when the desired coordinate position of the object image 13b is moved from an area which does not overlap the desired coordinate position of the object B to an area which overlaps the desired coordinate position of the object B, the object image 13b may be fixed at coordinates at which the object image 13b existed directly before the object image 13b is moved to the area which overlaps the desired coordinate position of the object B. In addition, when the object image 13b is moved from the area which overlaps the desired coordinate position of the object B to the area which does not overlap the desired coordinate position of the object B in response to movement of the user's finger, the object image 13b may be displayed again in a position which corresponds to a position which the user's finger touches.

Second Embodiment

The second embodiment is generally the same as the above first embodiment, and thus only points which are different from the first embodiment will be explained hereinafter. The present embodiment is different from the above first embodiment in the conditions which are used for retrieving object image data suitable for superposing on the three-dimensional image 13a. In the present embodiment, the first condition is that the object image data have a parallax which is larger than the parallax of any object, among the objects obtained by a CPU 8 in the parallax deriving processing of the Step SA6. The second condition in the present embodiment is that the object image data indicate an object image which falls within the whole area of the three-dimensional image selected as the background, that is, an area which is formed of object A, object B, and background part C. In addition, while an image arrangement adjusting screen G6 is displayed in the present embodiment, the drawing position of an object image 13b may be adjusted such that a desired coordinate position of the object image 13b, which is successively changed, does not go out of the whole area of the three-dimensional image selected as the background.

Third Embodiment

The third embodiment is generally the same as the above first embodiment, and thus only points which are different from the first embodiment will be explained hereinafter. The present embodiment is different from the above first embodiment in the conditions which are used for retrieving object image data suitable for superposing on the three-dimensional image 13a. In the present embodiment, the first condition is that the object image data have a parallax which is smaller than the parallax of any object, among the objects obtained by a CPU 8 in the parallax deriving processing of the Step SA6. The second condition in the present embodiment is that the object image data indicate an object image which can be disposed without overlapping any of objects that exist in the three-dimensional image selected as the background, that is, which does not overlap an area that is formed of object A and object B and falls within an area formed of background part C. In addition, while an image arrangement adjusting screen G6 is displayed in the present embodiment, the drawing position of an object image 13b may be adjusted such that a desired coordinate position of the object image 13b, which is successively changed, overlaps neither a desired coordinate position of object A nor a desired coordinate position of object B.

In the above embodiments, an image which is displayed on the display unit 2 in the image composition processing or the object image preparation processing may be displayed by using both the left-eye image data and the right-eye image data such that the image can be viewed in a three-dimensional manner, or may be displayed by using only one of the left-eye image data and the right-eye image data such that the image can be viewed in a two-dimensional manner. In addition, the embodiments may adopt a structure where the user can select whether the image is displayed in a three-dimensional manner or not.

Although the above embodiments show the case where an outline of an object is detected for each of the left-eye image data and right-eye image data, and deriving the parallax of an object image based on the difference in coordinate position of the outline, the parallax of the object image may be derived by using another method. For example, a characteristic part which is determined in consideration of color information or the like may be directly extracted from one of the left-eye image data and the right-eye image data, an image which corresponds to the extracted character part may be detected from the other image data, and thereafter a position shift quantity between the coordination positions may be determined as the parallax. In any case, the parallax of the object image is information which is obtained by quantifying the distance impression perceived by the viewer, and parallax may be obtained by another method, as long as parallaxes which can be compared between object image data items can be derived.

Although the above embodiments show the case where the object image serving as a foreground is superposed on the background serving as a background, with the size of the object image maintained, an object image with an enlarged or reduced image size may be superposed on the three-dimensional image while the parallax of the object image is maintained.

In addition, although the above embodiments show the case where an object image (material image) which serves as the foreground and is superposed on a three-dimensional image serving as the background is prepared by the digital photo frame 1, the object image may be prepared in any device other than the digital photo frame 1. In addition, for example, the object image may be generated from a single image by using an image processing technique.

Although the above embodiments show the case where the image composition apparatus of the present invention is carried out in a digital photo frame, the present invention may be applied to other electronic apparatuses such as digital cameras and mobile phones. In addition, the present invention may be carried out in an all-purpose personal computer. In such a case, the personal computer may be operated based on predetermined application software (program).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image composition apparatus comprising:
a parallax deriving unit configured to derive a parallax of each of a first area and a second area in a background image, wherein the first area corresponds to a first object in the background image and the second area corresponds to a second object in the background image;
an image retrieving unit configured to retrieve, based on a designated position within the background image, as a material image, an image which is suitable for being superposed on the background image from among a plurality of three-dimensional images, each of which is viewed as a specific object in a three-dimensional manner; and
an image composition unit configured to superpose the retrieved material image on the background image,
wherein when the parallax of the first area in the background image is smaller than the parallax of the second area in the background image and when the designated position is located within the first area, the image retrieving unit excludes a given image which is from among the plurality of three-dimensional images and which does not satisfy a given condition and retrieves, as the material image, the image which satisfies said given condition, wherein said given condition requires that said image has a parallax larger than the parallax of the first area in the background image and smaller than the parallax of the second area in the background image, and has one of (i) a size and (ii) a size and a shape, that is capable of being arranged such that the image does not overlap with the second area in the background image.

2. An image composition apparatus comprising:
a parallax deriving unit configured to derive a parallax of each of a first area and a second area in a background image, wherein the first area corresponds to a first object in the background image and the second area corresponds to a second object in the background image;
an image retrieving unit configured to retrieve, based on a designated position in the background image, as a material image, an image which is suitable for being superposed on the background image from among a plurality of three-dimensional images, each of which is viewed as a specific object in a three-dimensional manner; and
an image composition unit configured to superpose the retrieved material image on the background image,
wherein when the designated position is located in the first area, the image retrieving unit excludes a given image which is from among the plurality of three-dimensional images and which does not satisfy a given condition and retrieves, as the material image, the image which satisfies said given condition, wherein said given condition requires that said image has a parallax larger than the parallax of both of the first area and the second area in the background image, and which has one of (i) a size and (ii) a size and a shape, that falls within a whole area of the background image.

3. An image retrieval method comprising:
deriving a parallax of each of a first area and a second area in a background image, wherein the first area corresponds to a first object in the background image and the second area corresponds to a second object in the background image;
retrieving, based on a designated position within the background image, as a material image, an image which is suitable for being superposed on the background image from among a plurality of three-dimensional images, each of which is viewed as a specific object in a three-dimensional manner; and
superposing the retrieved material image on the background image,
wherein when the parallax of the first area in the background image is smaller than the parallax of the second area in the background image and when the designated position is located within the first area, a given image which is from among the plurality of three-dimensional images and which does not satisfy a given condition is excluded during the retrieving and the image which satisfies said given condition is retrieved as the material image, wherein said given condition requires that the image has a parallax larger than the parallax of the first area in the background image and smaller than the parallax of the second area in the background image, and has a size that is capable of being arranged such that the image does not overlap with the second area in the background image.

4. A non-transitory computer-readable storage medium having a program code stored thereon for causing a computer to perform image retrieval, the program code causing the computer to perform functions comprising:
deriving a parallax of each of a first area and a second area in a background image, wherein the first area corresponds to a first object in the background image and the second area corresponds to a second object in the background image;
retrieving, based on a designated position within the background image, as a material image, an image which is suitable for being superposed on the background image from among a plurality of three-dimensional images, each of which is viewed as a specific object in a three-dimensional manner; and
superposing the retrieved material image on the background image,
wherein when the parallax of the first area in the background image is smaller than the parallax of the second area in the background image and when the designated position is located within the first area, a given image which is from among the plurality of three-dimensional images and which does not satisfy a given condition is excluded during the retrieving and the image which satisfies said given condition is retrieved as the material image, wherein said given condition requires that the image has a parallax larger than the parallax of the first area in the background image and smaller than the parallax of the second area in the background image, and has a size that is capable of being arranged such that the image does not overlap with the second area in the background image.

5. An image composition apparatus comprising:

a display unit configured to display a background image;

a parallax deriving unit configured to derive a parallax of each of a plurality of areas in the background image, wherein each of the plurality of areas corresponds to each of a plurality of objects in the background image;

an image retrieving unit configured to retrieve, based on a designated position in the background image, as a material image, an image which is suitable for being superposed on the designated position in the background image from among a plurality of three-dimensional images, each of which is viewed as a specific object in a three-dimensional manner; and an image composition unit configured to superpose the retrieved material image on the background image, wherein when the designated position is located in a first one of the plurality of areas, the image retrieving unit excludes a given image which is from among the plurality of three-dimensional images and which does not satisfy a given condition and retrieves, as the material image, the image which satisfies said given condition, wherein said given condition requires that the image has a parallax larger than one of (i) the parallax of each of the plurality of areas, and (ii) a parallax of the background image at the designated position.

* * * * *

UNITED STATES PATENT AND TRADEMARK OFFICE
CERTIFICATE OF CORRECTION

| | | |
|---|---|---|
| PATENT NO. | : 8,995,750 B2 | Page 1 of 1 |
| APPLICATION NO. | : 13/247150 | |
| DATED | : March 31, 2015 | |
| INVENTOR(S) | : Kiyoshi Ogishima et al. | |

It is certified that error appears in the above-identified patent and that said Letters Patent is hereby corrected as shown below:

In the Claims

Column 16, Line 15, Claim 2:

after "and" delete "which".

Signed and Sealed this
Twenty-ninth Day of September, 2015

Michelle K. Lee
*Director of the United States Patent and Trademark Office*